United States Patent

[11] 3,585,286

[72] Inventor Albert Macovski
Palo Alto, Calif.
[21] Appl. No. 787,051
[22] Filed Dec. 26, 1968
[45] Patented June 15, 1971
[73] Assignee Stanford Research Institute
Menlo Park, Calif.

[54] SPATIAL FILTER COLOR ENCODING AND IMAGE REPRODUCING APPARATUS AND SYSTEM

19 Claims, 6 Drawing Figs.

[52] U.S. Cl. 178/5.4ST, 350/162 SF
[51] Int. Cl. H04n 9/06
[50] Field of Search 178/5.4, 5.4 STC, 350/162 SF; 95/12.21; 355/32, 34

[56] References Cited
UNITED STATES PATENTS

| | | | |
|---|---|---|---|
| 3,378,633 | 4/1968 | Macovski | 178/5.4 |
| 3,470,310 | 9/1969 | Shashoua | 178/5.4 |
| 3,419,672 | 12/1968 | Macovski | 178/5.4 STC |

*Primary Examiner*—Robert L. Richardson
*Assistant Examiner*—George G. Stellar
*Attorney*—Urban H. Faubion

ABSTRACT: A filter is provided in the path of light from a scene, either live or on film, ultimately to be displayed as on a television tube. The filter has the property of encoding color information in the intensity pattern of light transmitted. The encoded intensity pattern may be used directly or recorded and regenerated. The encoding medium of the filter comprises at least three grids superimposed one upon another and disposed at different angles relative to a reference whereby at least four different bands of frequencies are generated when the encoded intensity pattern is scanned, as by a photocathode. That is, a first band of frequencies is generated including a waveform (a video signal) proportionate to variations in light intensity, two individual bands of frequencies are generated each in separate individual waveforms (video signals) modulated in accordance with intensity variations of a different one selected component color, and a fourth individual band of frequencies is generated in a waveform modulated in accordance with intensity variations in color components including still another selected component color. The frequency bands are separated by filters and used to generate a color picture on a color receiver by applying the waveform incorporating the intensity band of frequencies (the first band) to the receiver to give the general picture luminance information, applying the waveforms containing the second, third, and fourth bands of frequencies to a processor (e.g. the matrix of a colorplexer) for developing color difference signals that are applied to the receiver along with the first band of frequencies, thereby to develop a color balanced picture.

Figure 1:
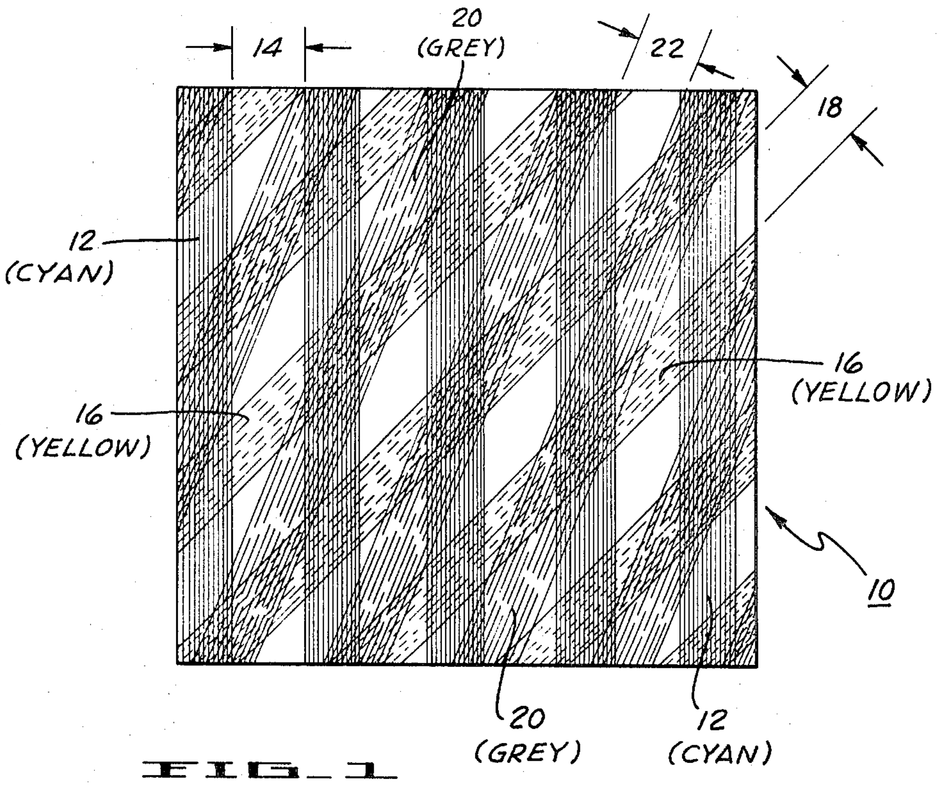

ALBERT MACOVSKI
INVENTOR.
BY Urban H. Faubion
ATTORNEY

ALBERT MACOVSKI
INVENTOR.

BY Urban H. Faubion

ATTORNEY

SPATIAL FILTER COLOR ENCODING AND IMAGE REPRODUCING APPARATUS AND SYSTEM

This invention relates to system and apparatus for encoding color information in an intensity pattern that may either be recorded on film of a monochromatic variety and regenerated for scanning by a single scanning beam in a television camera or scanned directly in such a manner as to produce simultaneously an electrical waveform or waveforms incorporating a number of frequency bands corresponding to component color information of the original scene to be reproduced in color which electrical waveforms can be processed and applied to a color television receiver thereby to reproduce a color picture of the original scene with color balance.

Practical color television systems have employed multiple cameras or multiple scanning beams in order to generate electrical waveforms (video signals) that represent brightness in the various component colors of a scene. Such systems which utilize motion picture film as the source of the video signals require color film to be used rather than the relatively inexpensive black and white, panchromatic sensitive film.

Both of these problems have been solved in a system described and claimed in U.S. Pat. No. 3,378,633, in the name of the present inventor and assigned to the assignee of the present application. That is, the patent describes a system wherein a filter is provided which has the property of encoding the different colors of a scene or color transparency in a transmitted light intensity pattern so that a single television camera can produce electrical waveforms from the encoded color information which are readily separable into video signals suitable for applying to color television receivers. The intensity pattern produced by light transmitted through the filter may be scanned directly to generate electrical waveforms containing the color information or it may be recorded on monochromatic film and an intensity pattern having the same information relative to component colors of the original scene may be regenerated by projecting a light through the transparency.

U.S. Pat. No. 3,378,633; supra, describes a system which is highly practical and solves most of the problems which rendered other single scanning beam color television systems impractical; however, one problem which is not completely solved by the system is loss of color balance in the event of attenuation of the color encoded video signals. Typically, a reproduced scene with a loss of the color carriers has a green cast and the highlights or high spots of the scene, e.g. those spots with high light levels which correspond to bright neutral areas, become bright green. The eye is not used to seeing a scene where things turn green and particularly where highlights are more intensely green. It is much less objectionable to the eye where any loss of color is more or less uniform. That is, it is less objectionable to have a scene lose color and turn to black and white or tend to black and white with proper tonal values than it is to have a scene change to a color such as green. This is what is mean by " color balance" in the present application.

It is an object of this invention to provide a system wherein color balance is not lost even where system defocusing or overload occurs.

Loss of color balance may occur either as a result of optical or electrical defocusing. In order better to understand the problem and its solution some explanation of the mode of generating the video signals which are utilized to reproduce a color picture on a receiver is in order.

In the system of U.S. Pat. No. 3,378,633; supra, three video signals are used. A first video signal is generated which is representative of or proportional to the overall scene brightness or luminance (referred to as luminance) which is much like the video signal used in producing an ordinary black and white picture and does in fact produce such a picture when applied to a television receiver with either a color or a black and white tube. The luminance signal (Y) is relatively broadband and of relatively low frequency, e.g. from 0 to 3 megahertz.

The remaining part of the color information is transmitted with a much reduced bandwidth (i.e., one-third of the monochrome or luminance bandwidth) and at a higher frequency. For example, the red and blue component video signals may each have a 1 megahertz bandwidth with the red centered at about 5 megahertz, and the blue centered at approximately 3.5 megahertz. It is common, then to subtract at least a portion of the luminance video signal from both the red and blue video signals thus to form red and blue color difference signals (R–Y) and (B–Y) and transmit the three video signals, e.g. luminance and the red and blue color difference signals (R–Y) and (B–Y) to the color television receiver. The two color difference signals are not unduly repeating the information which is already being conveyed by the luminance signal and at the same time all of the information necessary to produce a color image in the presently employed color television systems is present. At the color receiver, the signals are separated out again, or decoded, into their red, green and blue values and applied to the color display.

In order to save bandwidth the third primary color (as discussed here, the color green) is not generated directly. The color component green is derived from the difference between the sum of the red and blue component color video signals and the luminance video signal. Thus, if for any reason the red and blue video signals are eliminated or unduly attenuated, the system is, in effect, programmed to go green.

Accordingly, it is an object of the present invention to overcome this problem and provide a system wherein the total picture maintains a color balance even to the point of becoming a balanced black and white presentation in the event all or portions of the red and blue video signals are lost.

One example of attenuation which destroys color balance occurs where there is some loss in focus of the scanning beam. Under these conditions color encoded information is lost in a nonuniform manner so that color balance of the resultant reproduced image is destroyed. Another form of high frequency attenuation is optical defocusing which occurs where an imaged grating is used and the optical focus is not perfect. This attenuation phenomena also results in a loss of color balance in the reconstructed image.

Another problem occurs due to camera overload. That is, a camera tube tends to overload (i.e. exhibit reduced sensitivity) at relatively high subject light levels in a manner which causes the amplitude of the relatively high frequency color carrier waves to be reduced in amplitude disproportionately to the low frequency luminance signals. When the color representative signals are recovered from their respective carrier waves, their disproportionately reduced amplitudes are such that upon their combination with the low frequency luminance signals, erroneous color difference signals are produced. It has been necessary in the past to provide additional overload compensating circuitry to avoid this specific problem.

It is therefore an object of the present invention to provide a means of insuring color balance without additional overload compensating means.

From the above discussion it may be noted that the phenomena encountered (and previously described) affect the high frequency component color video signals more than a low frequency luminance video signal.

Accordingly, it is an object of the present invention to alleviate these problems by generating a third high frequency carrier from which color difference signals (e.g. R—Y and B—Y) are generated and from which a third color video signal (e.g. green) may be derived whereby filtering effects are comparable upon all three high frequency video signals, thereby resulting in color balanced picture reproduction.

In carrying out the invention in a preferred embodiment, a filter is provided in the path of light from a scene either live or on film ultimately to be displayed as on a television tube. The filter has the property of encoding color information in the intensity pattern of light transmitted. More specifically, the encoding medium of the filter comprises at least three grids superimposed one upon another and disposed at different angles relative to a reference, whereby at least four different bands of frequencies are generated when the encoded intensity pattern is scanned as by a scanning readout device such as a photocathode. That is, a first band of frequencies is generated in a waveform (a video signal) proportionate to variations in light intensity, two individual bands of frequencies are generated each in separate individual waveforms (video signals) modulated in accordance with intensity variations in color components including still another selected component color. The frequency bands are separated by filters and used to generate a color picture on a color receiver by applying or transmitting the waveform incorporating the intensity band of frequencies (the first band) to the receiver to give general picture luminance information, subtracting the waveform containing the fourth band of frequencies from each of the two individual waveforms that are each modulated in accordance with intensity variations of one different selected color and applying the two waveforms so obtained individually to a colorplexer matrix unit for developing color difference signals to apply to a television receiver.

Figure 2A:
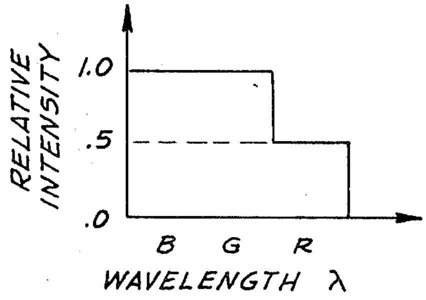
Figure 3:
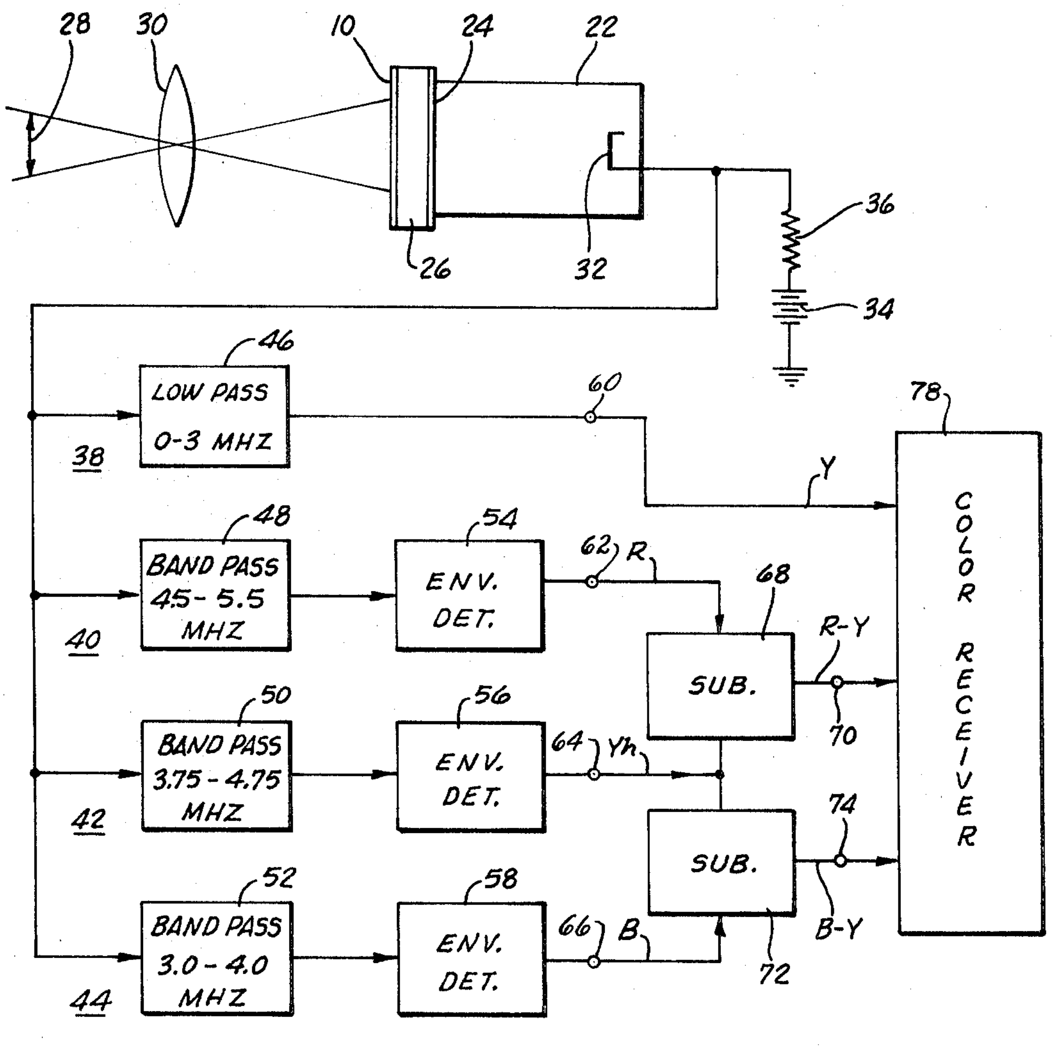
Figure 4:
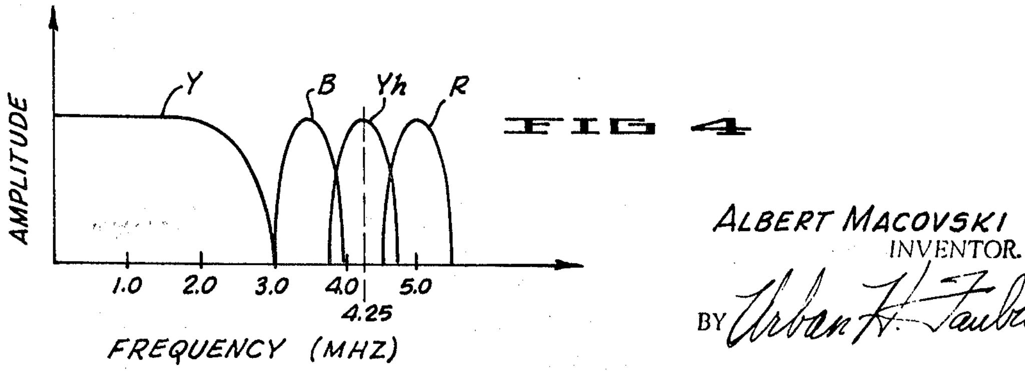

The novel features which are believed to be characteristic of the invention are set forth with particularity in the appended claims. The invention itself, however, together with further objects and advantages thereof, may best be understood by reference to the following description taken in connection with the accompanying drawings in which:

FIG. 1 shows a spatial filter employed in accordance with this invention for encoding color information on a transmitted intensity pattern which may be recorded, as on black and white panchromatic sensitive film, or scanned by a photocathode;

FIGS. 2A, B, and C, illustrate the spectral distribution of the average transmitted light of the spatial filter when the grids are cyan, yellow, and grey, respectively, and the Figures show wavelength plotted along the axis of abscissae, and intensity along the axis of ordinates;

FIG. 3 is a block schematic diagram of an arrangement for deriving the color information from a live scene utilizing a spatial filter in accordance with this invention and showing circuit elements utilized in producing information for generation or reproduction of a color picture on a color television receiver; and FIG. 4 is a graph of frequency in megahertz plotted along the axis of abscissae and intensity or amplitude along the axis of the ordinate showing the spectrum of the frequency distribution of color information provided when an intensity pattern produced utilizing a filter in accordance with this invention is scanned and the transmitted light is converted to electrical waveforms which are subsequently filtered.

The means illustrated here for encoding component color information from a scene in an intensity pattern is illustrated in FIG. 1. The system incorporates a spatial filter 10 which, as by way of example, encodes in an intensity pattern the two primary colors red and blue and another color or set of colors which includes the third primary color green. In order to encode the primary component color red from the image on an intensity pattern transmitted through the filter 10, a grid composed of lines of the subtractive primary color cyan 12 and alternate transparent lines or spaces 14 is positioned with its lines, for example, vertical. The primary color blue is encoded in the intensity pattern by utilizing a second grip superimposed over the vertical or cyan grid. The second grid is provided with spaced parallel lines disposed at a 45° angle relative to the lines 12 of the cyan grid and is composed of alternate lines 16 of the subtractive primary color yellow and transparent lines 18. The line density or number of lines per inch is made the same for the two grids of lines in a preferred embodiment. In order to encode color information including the third primary color green, still a third grid is superimposed on the first two grids in such a manner that it has spaced parallel lines which are at an angle between the vertical cyan lines 12 and the 45° yellow lines 16. In the embodiment illustrated the lines of the third grid and alternately grey lines 20 and transparent spaces 22. The grey lines 20 absorb the third primary color green along with the other colors in the luminance band.

Figure 2B:
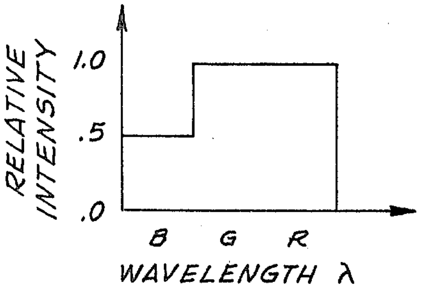
Figure 2C:
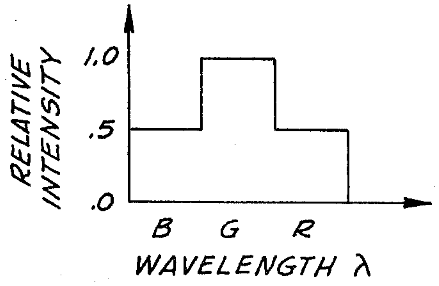

Thus the filter consisting of the three superimposed grids does not pass red light through its vertical cyan line 12, does not pass blue light through its 45° diagonal yellow lines 16, and in the present embodiment attenuates the luminance or intensity (which includes the green light) in the diagonal grey lines 20. An intensity pattern resulting from light transmitted from a scene through the filter (which may be recorded, for example, on monochrome film) has all of the red information spatially encoded in the form of vertical lines, all of the blue information spatially encoded in the form of 45° diagonal lines, green information spatially encoded in the luminance information of the intermediate diagonal lines, and overall luminance based upon total light transmitted. The average density of the resultant image has experienced three filters, one of which has attenuated, for example, half of the red light, another which has attenuated half of the blue light, and still a third which has attenuated part of the transmitted intensity or luminance. FIGS. 2A through C, inclusive, illustrate the spectral distribution of the filters in that they plot wavelength along the axis of abscissae and the relative intensity of the transmitted light along the axis of ordinates. FIG. 2A, for example, illustrates the spectral distribution of the cyan filter. An inspection of FIG. 2A shows that blue and green light are substantially unattenuated, but that red light has been reduced by substantially one-half. The reason for the half reduction in red intensity is that while the cyan lines 12 block red, the intermediate spaces 14 pass red. Thus only half of the red is blocked and half transmitted in the scanned intensity pattern. The spectral distribution of the yellow line filter is illustrated in FIG. 2B. The Figure shows that the blue light has been cut substantially in half but green and red light are essentially unattenuated. FIG. 2C shows the overall spectral distribution of light transmitted through both the cyan and yellow filters. Since one filter attenuates red and the other blue, the color component green peaks in overall spectral distribution. The spectral distribution of the grey line filter is not shown; however, the overall luminance is attenuated by the grey lines 20 but not by the intermediate spaces 22.

For an understanding of the way the intensity pattern transmitted by the spatial filter 10 is utilized, reference is made to FIGS. 3 and 4 of the drawings. In FIG. 3 the intensity pattern is used directly; however, it will be understood that the intensity pattern may be recorded on black and white film and the film itself used to generate an intensity pattern from which a color picture may be reproduced, since it is the intensity pattern itself which encodes the information relative to component colors of a scene. In FIG. 3 a color television camera is employed which includes a pickup tube 22, such as a vidicon, for example, having an internally formed photosensitive electrode 24. A spatial filter 10 as described relative to FIG. 1 is located either in direct contact with the face plate 26 of the tube or optically arranged to transmit light from a colored subject or scene 28 as by an optical system 30. The camera tube 22 also has a target 32 and other necessary conventional electrode structure (not shown) for producing an electron beam by which to scan the photosensitive electrode 24 for the production of composite video signals comprising both luminance and color information. As illustrated, the camera tube 22 is energized by a grounded voltage source 34 through an output load resistor 36. The output composite video signals are developed across the load resistor 36.

Before continuing with a description of the circuit, consider generation of electrical waveforms or video signals which contain information relative to component colors of a scene or object observed by the scanning camera 22. The scene or object 28 is focused upon the spatial filter 10 which transmits an intensity pattern onto the face plate 26 and photosensitive electrode 24 of the camera pickup tube 22. The electron beam generated in the camera tube scans the photosensitive electrode 24 and generates electrical waveforms dependent upon the image that appears on the photosensitive electrode. In this instance the image scanned is the intensity pattern transmitted by the spatial filter 10. The electrical waveforms so generated appear as a voltage drop across output load resistor 36 and is applied to the rest of the circuit.

First consider a perfectly white scene imaged on the pickup tube 22 with no spatial filter 10 in the light path. For this condition, a scan produces a pulse with essentially a flat top. That is, the signal is for all practical purposes a square wave. If the scene observed or imaged on the face of the tube contains variations in intensity, the variations appear as a higher frequency amplitude modulation of the "flat top" of the square wave. The content of the baseband signal which represents the luminance imaged on the face of the tube includes the frequency spectrum Y as illustrated in FIG. 4 which extends up to approximately 3 megacycles.

FIG. 4 is a plot illustrating the frequency distribution of information provided in the waveforms generated by the camera pickup tube 22 and contains frequency in megahertz plotted along the axis of abscissae and voltage amplitude plotted along the axis of the ordinate. Thus the luminance information relative to the image appearing on the face of photosensitive electrode 24 of pickup tube 22 is contained in the band of frequencies from 0 to approximately 3 megahertz.

Assuming again for the moment that white light is used instead of a colored image source but that the spatial filter 10 is interposed in the light path so that it projects an intensity pattern on the photosensitive electrode 24. The otherwise perfectly square luminance waveform is amplitude modulated by the three separate grid structures contained in the spatial filter 10 due to the fact that the grid structures attenuate transmitted light of different color content. The frequencies of modulation provided by the different grid structures are in different frequency bands and are dependent upon both the density of the grid lines (lines per unit distance) and the angular displacement of the grid lines.

For example, the cyan colored grid lines 12 (which are vertical) are spaced such that when the intensity pattern transmitted is scanned by the electron beam of camera pickup tube 22, it amplitude modulates the lower frequency signal at a 5 megahertz rate in the embodiment illustrated. Since the cyan lines 12 block red, or are subtractive to primary color red, and the interposed intermediate spaces 14 do not block red, the band of frequencies centered around the 5 megahertz center frequency (in FIG. 4) contains information relative to the component color red in the scene imaged and scanned.

In a like manner the grid containing yellow lines 16 and intermediate transparent spaces 18 encode the component color blue of the incident scene. In the illustration chosen (which has proven to be extremely practical) the number of lines per inch (or line density) of the "yellow grid" has been selected to be the same as for the "cyan grid"; however, since the yellow lines 16 are at a 45° angle relative to the cyan lines 12, these lines are scanned by the electron beam of camera pickup tube 22 (which scans horizontally) at a slower rate than the pattern transmitted by the cyan lines 12. Thus, the yellow lines 16 modulate the low frequency signal at a frequency centered around 3.5 megahertz (see band B in FIG. 4) instead of the 5 megahertz rate which encodes the red spectrum.

The grey grid lines 20 are positioned at an angle intermediate that of the cyan and yellow lines 12 and 16 respectively, thereby to generate a high frequency band that is, in the preferred embodiment, intermediate the bands incorporating the red and blue spectrum. Grey was selected as the line color because it will absorb colors of essentially the total color spectrum including the color green. Thus it may be considered green encoding and referred to either as the high frequency luminance band or green frequency spectrum. In the illustration this spectrum (labeled Y*h* ) is centered halfway between the 3.5 megahertz center frequency of the blue spectrum B and the 5 megahertz center frequency of the red spectrum R.

The discussion thus far has centered around a pure white light source or picture which contains a balance of all colors. Now assume that the scene or subject 28 contains a spectrum of intensities and a spectrum of colored objects. Light from the scene is transmitted through the spatial filter 10 onto the photosensitive electrode 24 of camera 22. As the beam generated in the pickup tube 22 scans the photosensitive electrode 24 a voltage is generated the amplitude of which is proportionate to the light on the photosensitive surface 24 and consequently the overall luminance of the scene observed. That is, an amplitude modulated low frequency base band signal is generated with the intensity of incident light encoded in the broadband low frequency luminance spectrum as described relative to FIG. 4.

The light from the scene having the color component blue is attenuated by the "yellow grid" of the filter. The beam from the pickup tube 22 scans the image on the photosensitive electrode 24 and generates the high frequency carrier centered around 3.5 megahertz due to the "yellow grid" as previously described which high frequency carrier or envelope is amplitude modulated in accordance with the intensity of the color component blue from the scene. In like manner the electrical waveform or high frequency carrier generated by the beam scanning the intensity pattern is attenuated by the vertical cyan lines 12 and is amplitude modulated by the intensity of the portion of the scene having the color component red.

In addition to these two high frequency video signals which are essentially the same as those generated in the system described and claimed in U.S. Pat. No. 3,378,633 supra, a fourth high frequency band results from scanning that portion of the intensity pattern which results from absorbtion by the "grey grid." As previously discussed, since the grid lines 20 are grey, they absorb light proportionate to overall luminance or, in other words, proportionate to the total color components including green in the scene. Of prime importance is that a third high frequency band of frequencies is generated.

The manner in which the electrical waveforms or video signals just described are utilized may best be understood by referring to the block circuit diagram of FIG. 3. As was previously pointed out, the video signals generated by the pickup tube 22 appear across load resistor 36 and thus are also applied to each of four individual color signal processing channels 38, 40, 42 and 44. Each of the four channels are provided for the purpose of passing a particular bit of encoded color information from the waveforms generated by image pickup tube 22. For example, the first channel (upper in the drawing) 38 is provided for the purpose of passing the low frequency luminance information and therefore is referred to as the broadband luminance channel, the remaining channels (reading down the drawing) 40, 42, and 44, respectively, are provided for the purpose of passing the red, high frequency luminance (or green) and blue component color information, respectively, and therefore may be referred to as the red R, high frequency luminance Y*h*, and blue B channels, respectively. In order to separate the different encoded color information in each of the channels, a filter is provided for each channel which passes the appropriate frequencies. That is, broadband luminance channel 38 is provided with a low-pass filter 46 which passes the frequency band from 0 to 3 MegaHertz and therefore passes the entire broadband luminance video signal which is applied at its output terminal 60. The red channel 40 is provided with a band-pass filter 48 which passes the frequency band from approximately 4.5 to 5.5 megahertz in which the band of frequencies containing information relative to component color red is encoded. The high frequency luminance channel 42 is provided with a band-pass filter 50 which passes the frequency band between 3.75 and 4.75 megahertz, and the blue channel 44 is provided with a band-pass filter 52 that passes the frequency range from 3 to 4 megahertz.

The output of the band-pass filters 48, 50 and 52, respectively, in the red high frequency luminance, and blue channels 40, 42, and 44, respectively are applied to envelope detectors 54, 56, and 58 to produce output electrical waveforms or video signals at their respective output terminals 62, 64, and 66 representing the red R, high frequency narrow band luminance,Y*h*, and blue B video signals respectively.

The output of the blue and high frequency luminance channels 42 and 44 are applied to a subtracting circuit 72 to produce a color difference video signal blue minus narrow band high frequency luminance (B—Y*h*) at output terminal 74. In a similar fashion the electrical waveform which appears at the output terminal 62 for the red channel 40 and the waveform which appears at the output terminal 64 of the narrow band high frequency luminance channel 42 is applied to another subtracting circuit 68 to produce a red color difference signal (R—Y*h*) at output terminal 70. Accordingly, there is derived from the system the three signal components which can be applied to a transmitter for transmission in a color television system or which can be applied directly to a color television receiver 78 which will produce in full color the image of the original scene.

As previously indicated, the intensity pattern scanned on the pickup tube 22 may be produced by the filter and recorded on film and then reproduced on the face of the pickup tube or may be produced on the face of the pickup tube as in a conventional television camera. Further, it is to be understood that the filter may be provided directly on the face on the pickup tube either externally or internally.

Thus, the objects of the invention are carried out by providing the color difference signals from three high frequency bands which are comparable in frequency so that any attenuation of one band is applied essentially equally to all regardless of whether the attenuation is electrical, optical, or due to camera tube overload.

While a particular embodiment of the invention has been shown and described it will, of course, be understood that the invention is not limited thereto, since many modifications both in the circuit arrangement and in the instrumentalities employed may be made. It is contemplated that the appended claims will cover any such modifications as fall within the true spirit and scope of the invention.

What I claim is:

1. In a system for generating electrical waveforms from which a color television receiver may reproduce a color picture from a light intensity pattern, A. A filter for transmitting light from a scene to be produced and producing a light intensity pattern with encoded color information from which the color picture may be produced, said filter comprising
   1. at least three grids superimposed one upon another and disposed at different angles relative to a reference in a manner so that the angles, where the lines of one of the grids cross the lines of second grid differ from the angles made where the lines of the third grid cross the lines of said second grid,
   2. each of said grids comprising parallel spaced lines with the spaces between the lines passing light of all colors,
   3. The lines of at least two of said grids each being of different subtractive primary colors, and
   4. the lines of the said third grid being grey.

2. Apparatus as defined in claim 1 wherein the line density of at least two of said grids is the same.

3. Apparatus as defined in claim 1 wherein the said lines of the three grids of said filter are cyan, yellow and grey, respectively.

4. Apparatus as defined in claim 1 wherein the said lines of the three grids of said filter are cyan, yellow and grey and at least the cyan and yellow grids are of the same density.

5. Apparatus as defined in claim 1 wherein the said lines of said three grids are cyan, yellow, and grey respectively, and the said yellow lines are disposed at a 45° angle relative to the cyan lines and said grey lines are disposed at an angle of less than 45° relative to said cyan lines.

6. Apparatus as recited in claim 1 wherein the relative angle between said first two grids is 45° and the lines of said third grid are disposed at an angle between those of said first and second grids.

7. Apparatus as defined in claim 6 wherein the line density of at least the said first two grids is the same.

8. A system for generating color encoded electrical waveforms required for a color television receiver to reproduce a scene in color including in combination A. Filter means exposed to and transmitting light from a scene to be reproduced for producing a color encoded light intensity pattern,
   1. said filter means having at least three independent grid structures each made up of lines thereby to produce an intensity pattern with general overall intensity proportionate to scene luminance and color information encoded relative to at least three different component colors, and B. scanning means for scanning said intensity pattern thereby to generate four output electrical waveforms containing four individual frequency bands having scene component color information from which color encoded electrical waveforms are derived that can be utilized to reproduce the scene in color on a color television receiver.

9. A system as defined in claim 8 wherein the line density of at least two of said grids is the same.

10. A system as defined in claim 8 wherein the said lines of the three grids of said filter are cyan, yellow and grey respectively.

11. A system as defined in claim 8 wherein the said lines of the three grids of said filter are cyan, yellow and grey and at least the cyan and yellow grids are of the same density.

12. A system as defined in claim 8 wherein the said lines of said three grids are cyan, yellow, and grey respectively and the said yellow lines are disposed at a 45° angle relative to the cyan lines and said grey lines are disposed at an angle of less than 45° relative to said cyan lines.

13. A system as defined in claim 8 wherein the relative angle between said first two grids is 45° and the lines of said third grid are disposed at an angle between those of said first and second grids.

14. A system as defined in claim 13 wherein the line density of at least the said first two grids is the same.

15. A system as defined in claim 8 wherein the electrical waveforms generated by said scanning means include A. first relatively low frequency band proportionate to general scene luminance B. second and third electrical waveforms containing second and third separate and relatively high frequency bands, respectively C. fourth electrical waveform containing fourth relatively high frequency band intermediate said second and third frequency bands including color information relative to a third component color.

16. A system as defined in claim 15 wherein said second and third electrical waveforms containing said second and third frequency bands incorporate the component colors red and blue, respectively, and said fourth electrical waveform containing said fourth frequency band is proportionate to component colors including the component color green.

17. A system as defined in claim 16 wherein filter means are provided for separating said four frequency bands, circuit matrix means wherein said fourth electrical waveform is subtracted from said second and third waveforms, respectively, thereby to provide two color difference encoding electrical waveforms whereby said two color difference electrical waveforms and said first electrical waveform containing the said low frequency band may be processed to provide full color information.

18. A method of generating electrical waveforms required for a color television receiver to reproduce a scene in color comprising generating at least four electrical waveforms including one relatively low frequency waveform proportionate to overall luminance of a scene to be reproduced, a second waveform having a first band of high frequencies proportionate to at least one of the primary colors, a second band of high frequencies proportionate to another one of the primary colors, and a third band of high frequencies having information contained therein relative to a third one of the primary colors, combining the said three high frequency color bands in such a manner as to produce two color difference electrical waveforms whereby the said low frequency band and the two said color difference waveforms may be applied to a television receiver thereby to produce a scene in color.

19. A method of generating electrical signals for color television receiver to reproduce a scene in color comprising generating at least four electrical waveforms including one relatively low frequency waveform proportionate to overall luminance of a scene to be reproduced, a second waveform having a first band of high frequencies proportionate to the primary component color red, a second band of high frequencies proportionate to the color component blue, and a third band of high frequencies intermediate said first and second band of high frequencies including therein information relative to the color component green, subtracting said third band of high frequency from said first band of high frequency thereby to produce a color difference electrical waveform subtracting said third band of high frequency from said second band of high frequencies thereby to produce a second color difference electrical waveform.